(12) United States Patent
Deshmukh et al.

(10) Patent No.: US 9,876,861 B2
(45) Date of Patent: *Jan. 23, 2018

(54) AUTONOMIC DISCOVERY AND INTEGRATION OF COMPLEMENTARY INTERNET SERVICES

(71) Applicant: International Business Machines Corporation, Armonk, NY (US)

(72) Inventors: Abhijit A. Deshmukh, Pune (IN); Anurag Srivastava, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1094 days.

This patent is subject to a terminal disclaimer.

(21) Appl. No.: 13/870,159

(22) Filed: Apr. 25, 2013

(65) Prior Publication Data
US 2013/0275584 A1     Oct. 17, 2013

Related U.S. Application Data

(63) Continuation of application No. 13/420,422, filed on Mar. 14, 2012.

(51) Int. Cl.
*H04L 29/08* (2006.01)

(52) U.S. Cl.
CPC .................... *H04L 67/16* (2013.01)

(58) Field of Classification Search
CPC ......... H04L 29/08072; H04L 29/06; H04L 12/2602
See application file for complete search history.

(56) References Cited

U.S. PATENT DOCUMENTS

| | | | |
|---|---|---|---|
| 8,019,683 B1 | 9/2011 | Swanburg et al. | |
| 8,707,261 B2 | 4/2014 | Heller et al. | |
| 2001/0056354 A1 | 12/2001 | Feit et al. | |
| 2005/0105467 A1 | 5/2005 | True et al. | |
| 2010/0262624 A1* | 10/2010 | Pullikottil | 707/783 |
| 2011/0138047 A1 | 6/2011 | Brown et al. | |
| 2011/0138050 A1 | 6/2011 | Dawson et al. | |
| 2011/0153727 A1 | 6/2011 | Li | |
| 2012/0233209 A1* | 9/2012 | Cheng et al. | 707/770 |
| 2013/0018999 A1* | 1/2013 | Merrill et al. | 709/223 |

(Continued)

OTHER PUBLICATIONS

"Business Strategy for Cloud Providers—The Case for Potential Cloud Services Providers," [online] IBM Corporation, 2009, retrieved from the Internet: <http://www-935.ibm.com/services/us/en/business-services/ibm-strategy-and-change-services-for-cloud-providers.html> 16 pgs.

(Continued)

*Primary Examiner* — Abdullahi E Salad
(74) *Attorney, Agent, or Firm* — Cuenot, Forsythe & Kim, LLC

(57) ABSTRACT

Autonomic discovery and integration of complementary Internet services can include discovering a plurality of services that are complementary to an offered service and selecting a service from the plurality of services as a candidate for integration with the offered service. A new service can be automatically generated by integrating the candidate service with the offered service. The new service can be included in a service catalog.

17 Claims, 5 Drawing Sheets

(56) References Cited

U.S. PATENT DOCUMENTS

2013/0204746 A1    8/2013  Lee et al.
2013/0246607 A1*  9/2013  Deshmukh et al. .......... 709/224

OTHER PUBLICATIONS

Badger, L, et al., "US Government Cloud Computing Technology Roadmap," [online] NIST, Spec. Pub. 500-293, Nov. 2011, retrieved from the Internet: <www.nist.gov/itl/cloud/upload/SP_500_293_volumeII.pdf>, 85 pgs.

Wurth, R., "Is a cloud marketplace for you," [online] Pudai, LLC, Aug. 12, 2011 [retrieved Feb. 10, 2012] retrireved from the Internet: <http://www.smallcloudbuilder.com/everything-else/articles/420-is-a-cloud-marketplace-for-you>, 4pgs.

Han, T., et al., "An ontology enhanced cloud service discovery system," Proc. of Int'l Multiconference of Engineers and Computer Scientists (IMECS 2010), vol. I, Mar. 17-19, 2010, <www.iaeng.org/publication/IMECS2010/IMECS2010_pp644-649.pdf>, 6 pgs.

U.S. Appl. No. 13/420,422, Non-Final Office Action, dated Jan. 5, 2015, 8 pg.

\* cited by examiner

AUTONOMIC DISCOVERY AND INTEGRATION OF COMPLEMENTARY INTERNET SERVICES

CROSS-REFERENCE TO RELATED APPLICATIONS

This application is a Continuation of U.S. application Ser. No. 13/420,422, filed on Mar. 14, 2012, the entirety of which is incorporated herein by reference.

BACKGROUND

One or more embodiments disclosed within this specification relate to services including, for example, cloud-based services. Services available over communication networks have continued to proliferate. Service offerings from providers continue to increase in both number and sophistication. In some cases, it can be beneficial to utilize a service offering from one service provider with a service offering from another service provider. Presently, using multiple service offerings together requires significant levels of manual intervention as the process is both complex and time-consuming.

BRIEF SUMMARY

One or more embodiments disclosed within this specification relate to autonomic discovery and integration of complementary services.

Another embodiment can include a system having a processor. The processor can be configured to initiate executable operations and/or functions as described within this specification. The executable operations can include discovering a plurality of services that are complementary to an offered service and selecting a service from the plurality of services as a candidate for integration with the offered service. The executable operations also can include automatically generating a new service by integrating the candidate service with the offered service and including the new service in a service catalog.

Another embodiment can include a computer program product for [state function]. The computer program product can include a computer readable storage medium having stored thereon program code that, when executed, configures a processor to perform the various functions and/or operations described within this specification. The operations can include discovering a plurality of services that are complementary to an offered service and selecting a service from the plurality of services as a candidate for integration with the offered service. The operations further can include automatically generating a new service by integrating the candidate service with the offered service and including the new service in a service catalog.

DETAILED DESCRIPTION

Figure 1:
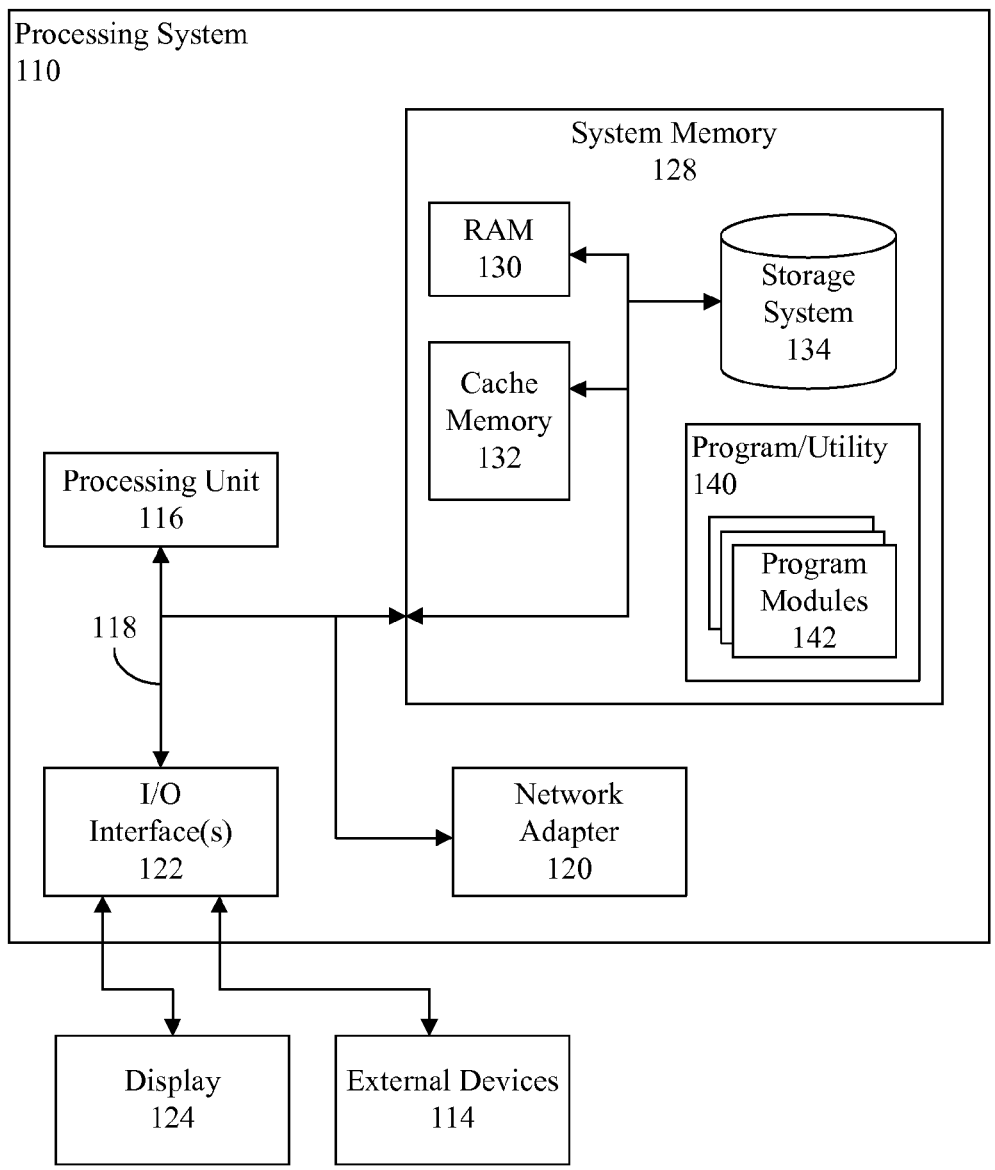
FIG. 1 is a block diagram illustrating an example of a cloud computing node in accordance with an embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to autonomic discovery and integration of complementary services. In accordance with the inventive arrangements disclosed within this specification, a plurality of services can be identified and evaluated as candidates for combination with one or more other services to create one or more new services. Those candidates that are selected can be automatically integrated with the other services and be made available for use, for example, via listing the new service(s) in a registry.

It is understood in advance that although this disclosure includes a detailed description on cloud computing, implementation of the teachings recited herein are not limited to a cloud computing environment. Rather, embodiments disclosed within this specification can be implemented in conjunction with any other type of computing environment now known or later developed.

In general, cloud computing refers to a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics can include the following:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models can include the following:

Software as a Service (SaaS): the capability provided to the consumer is to use the provider's applications running on a cloud infrastructure. The applications are accessible from various client devices through a thin client interface such as a Web browser (e.g., Web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models can include the following:

Private cloud: the cloud infrastructure is operated solely for an organization. The cloud infrastructure may be managed by the organization or a third party and may exist on-premises or off-premises of the organization.

Community cloud: the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises of the organization.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. Generally, cloud computing refers to the use of an infrastructure that includes a network of interconnected nodes.

FIG. 1 is a block diagram illustrating an example of a cloud computing node in accordance with an embodiment disclosed within this specification. Cloud computing node 100 is only one example of a suitable cloud computing node and is not intended to suggest any limitation as to the scope of use or functionality of the embodiments disclosed within this specification. Regardless, cloud computing node 100 is capable of being implemented and/or performing any of the functionality set forth hereinabove.

Cloud computing node 100 can include a processing system 110, e.g., a server, which is operational with numerous other general purpose or special purpose computing system environments or configurations. Examples of well-known computing systems, environments, and/or configurations that may be suitable for use with processing system 110 can include, but are not limited to, personal computer systems, server computer systems, control nodes, storage area network (SAN) controllers, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Processing system 110 may be described in the general context of computer system executable instructions, such as program modules, being executed by a computer system or other processing system. Generally, program modules may include routines, programs, objects, components, logic, data structures, and so on that perform particular tasks or implement particular abstract data types. The processing system 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, processing system 110 in cloud computing node 100 is shown in the form of a general-purpose computing device. The components of processing system 110 may include, but are not limited to, one or more processors or processing unit(s) 116, a system memory 128, and a bus 118 that couples various system components including system memory 128 to processor unit 116.

Bus 118 represents one or more of any of several types of bus structures, including a memory bus or memory controller, a peripheral bus, an accelerated graphics port, and a processor or local bus using any of a variety of bus architectures or other suitable circuitry. By way of example, and not limitation, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Processing system 110 typically may include a variety of computer-readable storage media. Such media may be any available media that is accessible by the processing system 110. Computer-readable storage media can include both volatile and non-volatile media and removable and non-removable media. System memory 128 can include computer-readable storage media in the form of volatile memory, such as random access memory (RAM) 130 and/or cache memory 132. Processing system 110 may further include other removable/non-removable, volatile/non-volatile computer-readable storage media. By way of example only, a storage system 134 can be provided for reading from and writing to at least one non-volatile computer-readable storage media. Examples of computer-readable storage media can include, but are not limited to, a data storage device that comprises non-volatile magnetic media (e.g., a "hard disk drive" or "HDD"), a data storage device that comprises non-volatile solid state media (e.g., a "solid state drive" or "SSD"), a data storage device that comprises non-volatile magneto-optical media, and the like. Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM or other optical media, a solid state drive for reading from or writing to a removable, non-volatile, solid state drive can be provided. In such instances, each can be connected to bus 118 by one or more data media interfaces, such as a fiber channel interface, a serial advanced technology attachment (SATA) interface, a small computer system interface (SCSI) interface, a serial attached SCSI (SAS) interface, or the like.

System memory 128 may include at least one computer program product that includes a computer-readable storage medium having computer-readable program code embodied therewith. The "computer-readable storage medium" can be non-transitory in nature. The computer-readable program code can include a set (e.g., at least one) of program modules that are configured to carry out the functions of embodiments disclosed within this specification. The program/utility 140, having a set (at least one) of program modules 142, may be stored in system memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments disclosed within this specification.

Processing system 110 may also communicate with one or more external devices 114 such as a keyboard, a pointing device, a display 124, etc.; one or more devices that enable a user to interact with processing system 110; and/or any devices (e.g., network card, modem, etc.) that enable processing system 110 to communicate with one or more other computing devices. Such communication can occur via Input/Output (I/O) interfaces 122.

In addition, processing system 110 can communicate with one or more networks such as a LAN, a general WAN, and/or a public network (e.g., the Internet) via network adapter 120. As depicted, network adapter 120 can communicate with the other components of processing system 110 via bus 118. It should be understood that although not shown, other hardware and/or software components can be used in conjunction with processing system 110. Examples of such other hardware and/or software components can include, but are not limited to, microcode, device drivers, redundant processing units, external disk drive arrays, RAID systems, tape drives, data archival storage systems, etc.

Figure 2:
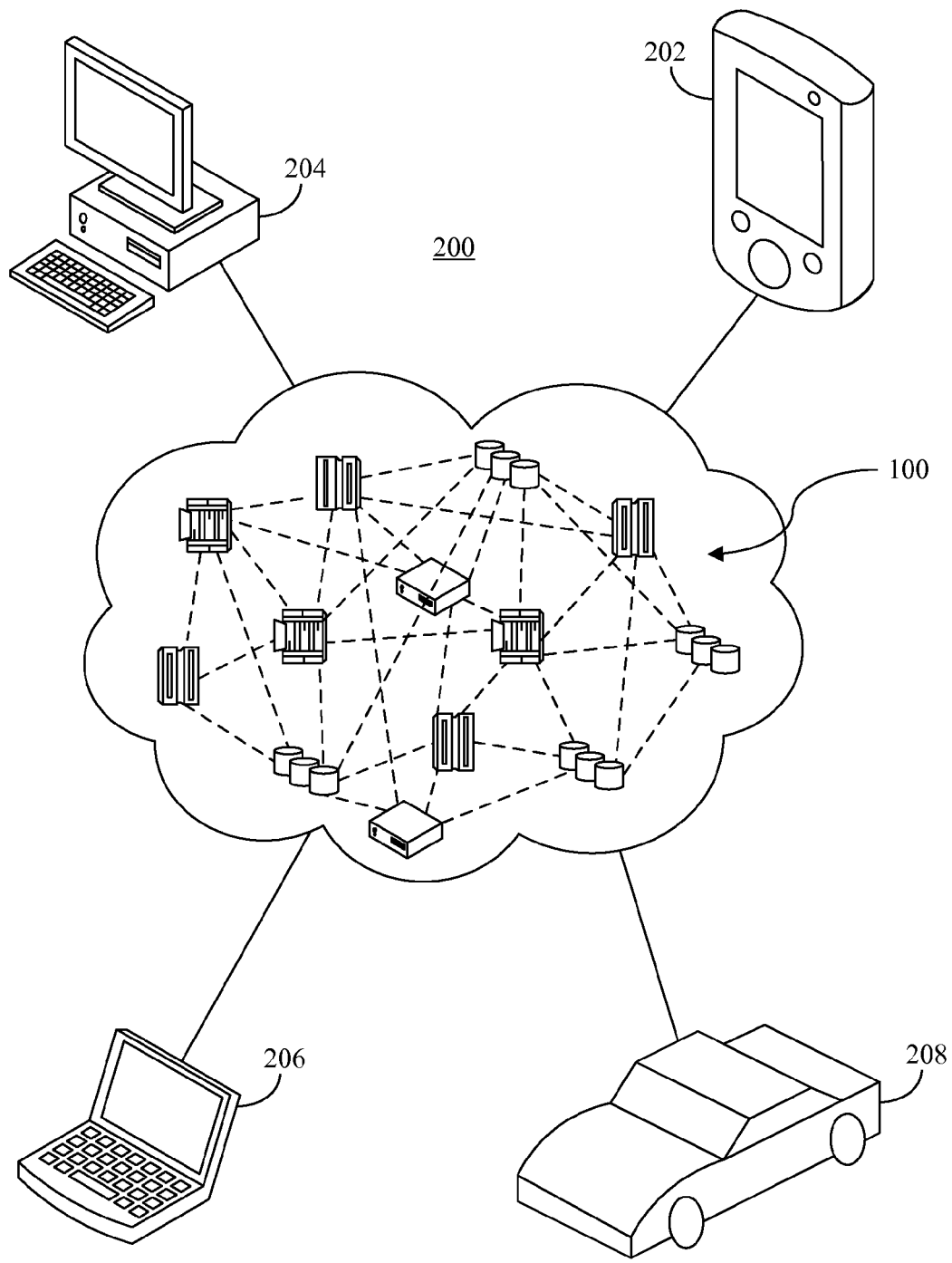
FIG. 2 is a block diagram illustrating an example of a cloud computing environment in accordance with another embodiment disclosed within this specification.

FIG. 2 is a block diagram illustrating an example of a cloud computing environment 200 in accordance with another embodiment disclosed within this specification. As shown, cloud computing environment 200 includes one or more cloud computing nodes 100 with which local computing devices used by cloud consumers, such as, for example, a PDA or cellular telephone 202, a desktop computer 204, a laptop computer 206, and/or an automobile computer system 208 may communicate. Like numbers will be used to refer to the same items throughout this specification.

As illustrated, cloud computing nodes 100 may communicate with one another. Cloud computing nodes 100 can be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 202-208 shown in FIG. 2 are intended to be illustrative only and that computing nodes 100 and cloud computing environment 200 can communicate with any type of computerized device over any type of network and/or network addressable connection (e.g., using a Web browser).

Figure 3:
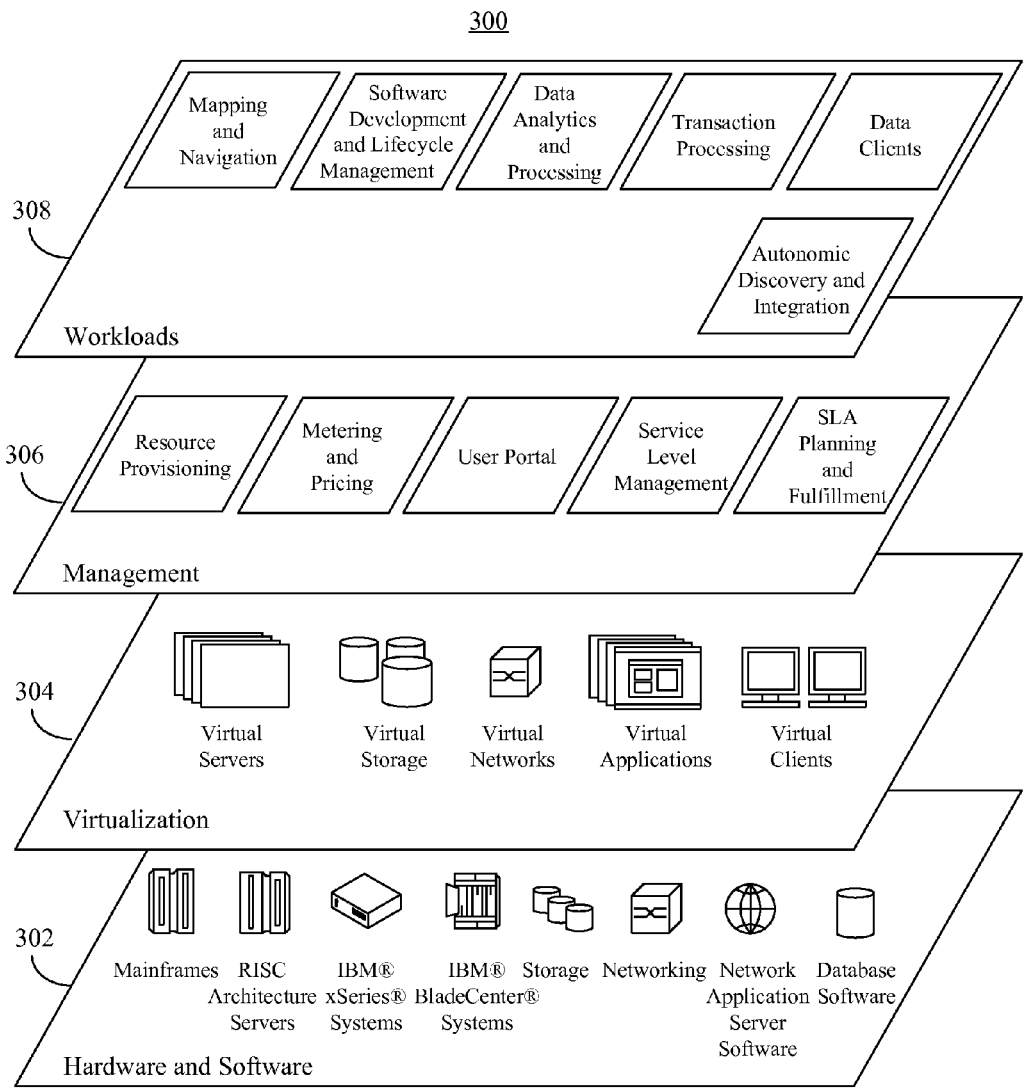
FIG. 3 is a block diagram illustrating an example of functional abstraction layers provided in a cloud computing environment in accordance with another embodiment disclosed within this specification.

FIG. 3 is a block diagram illustrating an example of a set of functional abstraction layers 300 provided in a cloud computing environment in accordance with another embodiment disclosed within this specification. Set 300 of functional abstraction layers can be provided by a cloud computing environment such as cloud computing environment 200 of FIG. 2. It should be understood that the components, layers, and functions shown in FIG. 3 are intended to be illustrative only and not limiting of the embodiments disclosed within this specification. As depicted, the following layers and corresponding functions are provided:

A hardware and software layer 302 can include hardware and software components. Examples of hardware components can include, but are not limited to, mainframes, in one example IBM® zSeries® systems; RISC (Reduced Instruction Set Computer) architecture based servers, in one example IBM pSeries® systems; IBM xSeries® systems; IBM BladeCenter® systems; storage systems (e.g., storage arrays, network attached storages (NASs), and the like); and networking components. Networking components can include any of a variety of routers, switches, network adapters, and the like.

Examples of software components include network application server software, in one example IBM WebSphere® application server software; and RAID array control software, in one example IBM SAN volume controller, which can execute on an IBM SVC Storage Engine. (IBM, zSeries, pSeries, xSeries, BladeCenter, WebSphere, and DB2 are trademarks of International Business Machines Corporation registered in many jurisdictions worldwide).

A virtualization layer 304 can provide an abstraction layer from which the following examples of virtual entities may be provided: virtual servers; virtual storage; virtual networks, including virtual private networks; virtual applications and operating systems; and virtual clients.

In one example, a management layer 306 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 308 can provide examples of functionality for which the cloud computing environment may be utilized. Examples of workloads and functions which may be provided from this layer include: mapping and navigation; software development and lifecycle management; data analytics processing; transaction processing; and data storage/delivery. In one aspect, workloads layer 308 can include an autonomic discover and integration module.

Figure 4:
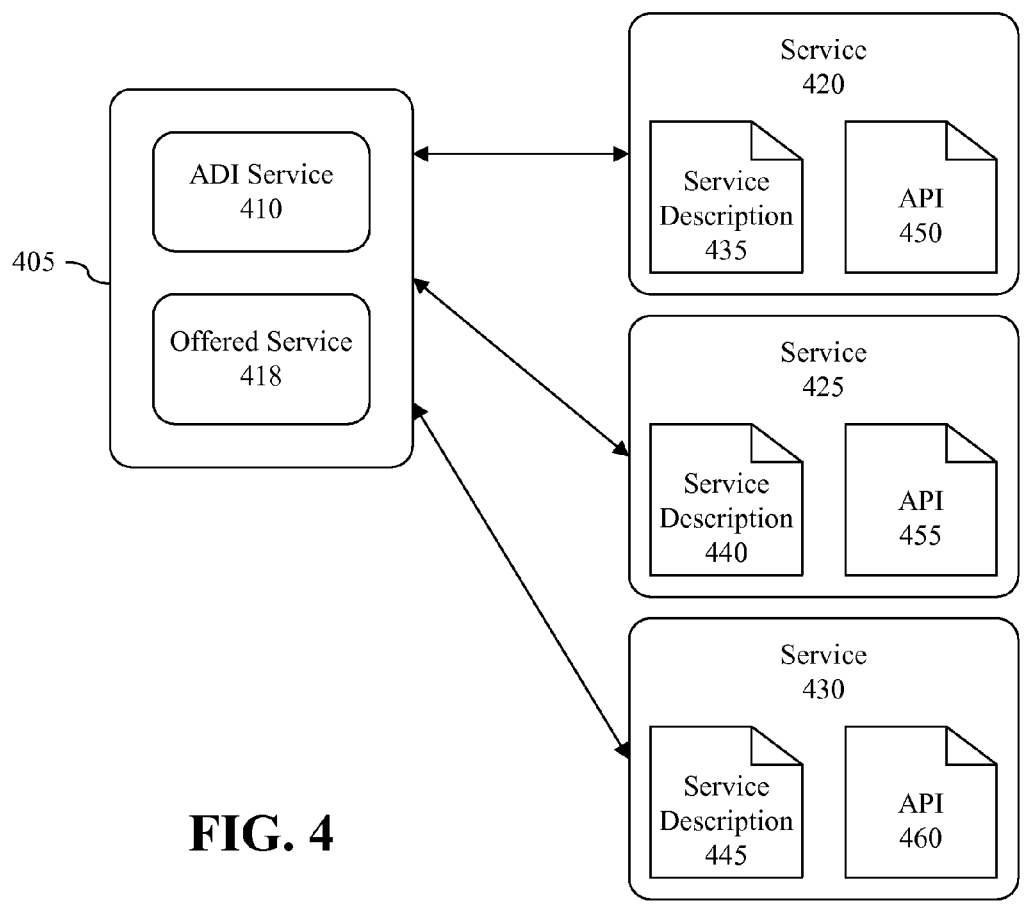
FIG. 4 is a block diagram illustrating operation of an autonomic discovery and integration service in accordance with another embodiment disclosed within this specification.

FIG. 4 is a block diagram illustrating operation of an autonomic discovery and integration service in accordance with another embodiment disclosed within this specification. As shown, a computing environment 405 can include an autonomic discovery and integration (ADI) service 410 and an offered service 415. In one aspect, computing environment 405 can be implemented in the form of a processing node as described with reference to FIG. 1. In another aspect, computing environment 405 can be implemented as a collection of processing nodes as illustrated with reference to FIGS. 2 and 3.

Offered service 415 can be any of a variety of services, e.g., a cloud service, available from computing environment 405. For example, offered service 415 can be an electronic mail service, a document management service, an accounting service, or the like. It should be appreciated that the particular type of exemplary services listed are provided for purposes of illustration and, as such, are not intended to limit the embodiments disclosed within this specification.

ADI service 410 also can be implemented within computing environment 405. In general, ADI service 410 can be configured to identify one or more different services and, from the identified services, determine which are considered complementary to offered service 415, select one or more of the complementary services as candidates for combining with the offered service, integrate the candidate services, and provide a combination of offered service 415 and the one or more candidate services as a new service. In one aspect, a service that is considered "complementary" with regard to an offered service can be one that serves to fill out or complete the offered service or otherwise adds value to the offered service by providing a feature that is currently lacking or not available.

As shown, one or more other services 420, 425, and 430 are also shown. Each of services 420-430 can be available from a different provider, e.g., a different business entity providing services as described. Thus, in one aspect, each of services 420-430 can be provided via a different computing environment operated by the corresponding service provider. In another aspect, however, while the providers of services 420-430 may be distinct business entities, one or more of the providers may utilize the computing infrastructure made available from a same computing infrastructure provider. In this regard, while one or more or all of services 420-430 may be available from a different and independent service provider, one or more or all of the service providers may be available from a same computing environment as provided by the computing infrastructure provider.

Accordingly, each of services 420-430 can include, or otherwise make available, a respective service description 435-445. In general, a service description such as service description 435, 440, and/or 445, can be implemented as a listing of the capabilities of a service. For purposes of illustration, service description 435 is described. It should be appreciated that service descriptions 440 and/or 445 can be implemented in the same or similar manner for services 425 and/or 430 respectively.

Service description 435 can specify the particular capabilities of service 420. To facilitate understanding across services and service providers, service description 435 can be specified in a standardized format that is understandable by other services when read. In one aspect, service description 435 can specify technical features of the service. In another aspect, service description 435 can specify business features of the service.

Referring to technical features, service description 435 can specify information such as the type of service being offered, e.g., electronic mail, encryption service, data archiving, etc. For each different type of service that is available, one or more parameters of the service that define the capabilities of the service can be specified. For example, in the case of an encryption service, the type can indicate that the service performs data encryption. Further attributes that can be specified by the service description can include the type of encryption technology that is utilized, the strength of the encryption provided, the amount of data that can be encrypted and/or decrypted per unit time, or the like.

In the case of an electronic mail service, the service description can indicate a type of electronic mail. Further attributes that can be specified by the service description can include whether the service provides IMAP support, POP3 support, the amount of storage provided per account, the maximum size of an electronic mail inclusive of attachments, the maximum attachment size, the maximum number of attachments that can be included in each individual electronic mail, etc.

Referring to business features of the service, service description 435 can specify information such as price, SLA, and the like. The SLA can indicate information such as uptime guarantees and whether the SLA is penalty-based. In one aspect, only those services having a particular type of SLA, e.g., a penalty-based SLA, can be eligible for consideration as a candidate for use in integration with an offered service. It should be appreciated, however, that one or more other parameters of the service description and/or the application programming interface (API) of a service can be considered.

It should be appreciated that the particular attributes/examples of technical features and/or business features are provided for purposes of illustration only. Other features can be specified. Further, various combinations of features, whether technical, business, or a combination thereof, can be specified. For example, various grades of service and various options of technical features that are correlated with different prices can be specified within service description 435.

Each of services 420-430 further can include a respective API 450-460. In general, an API such as APIs 450, 455, and/or 460, can define the specific operations available from a service (e.g., commands) and how to specifically invoke such operations. For example, an API can define the exact syntax for invoking a particular operation as performed by the service and the arguments or parameters that are to be provided as part of the command that invokes the operation. The API further can specify the particular output that is generated by each operation and the format of the output that can be expected responsive to invoking a particular operation using the specified command.

In operation, ADI service 410 can be configured to discover one or more services that are available for integration with one or more other services. For purposes of description, operation of ADI service 410 is described with reference to offered service 415. In this regard, ADI service 410 can be configured to discover services that are considered to be complementary of offered service 415.

For example, ADI service 410 can be configured, e.g., programmed, with one or more preferences for different services that are considered complementary to offered service 415. In illustration, consider the case in which offered service 415 is an electronic mail service. Complementary services can be those that can be used in conjunction, or combination, with offered service 415. For example, an encryption service and an archival service can be two services that can be used in combination with offered service 415 that would allow computing environment 405 to provide an encrypted, electronic mail archive service. Thus, ADI service 410 can be programmed to search for one or more enumerated services specified as being complementary to offered service 415.

ADI service 410, having discovered one or more services, e.g., services 420-430, can identify one or more of the identified services as candidate services for use in integrating with offered service 415. ADI service 410 can evaluate each of the candidate services for suitability in integrating with offered service 415, automatically integrate one or more of the candidate services, and provide the resulting combination of services as a new service.

Figure 5:
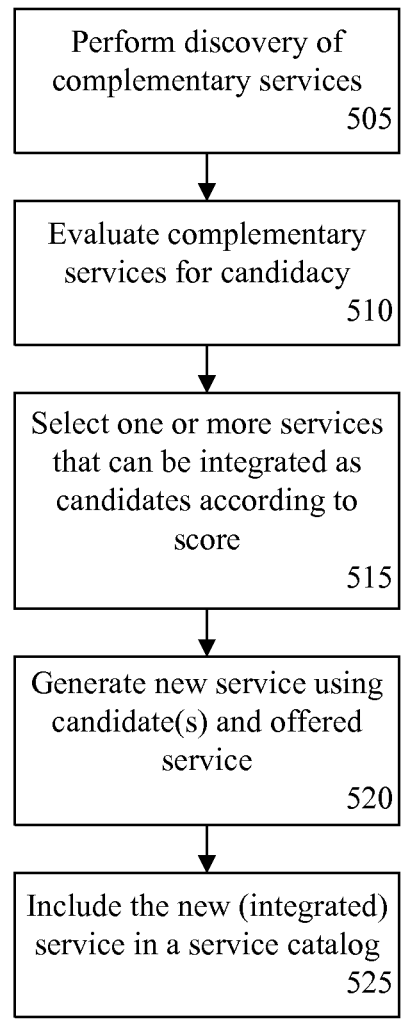
FIG. 5 is a flow chart illustrating a method of autonomic discovery and integration of services in accordance with another embodiment disclosed within this specification.

FIG. 5 is a flow chart illustrating a method 500 of autonomic discovery and integration of services in accordance with another embodiment disclosed within this specification. Method 500 can be performed by a system as illustrated within FIGS. 1-4 of this specification. In general, the system can be configured to identify one or more other services that are complementary with a particular offered service in order to expand the portfolio of available service offerings.

In step 505, the system can implement a discovery procedure to identify one or more other services offered by other providers. The system, for example, can be configured to search or discover one or more other services that have been determined to be complementary to an offered service. Taking the prior example of an electronic mail offered service, the system can be configured to seek out an encryption service and a data archiving service. The particular services, e.g., service types, that are considered complementary can be specified by an administrator of the system, for instance.

The system can discover other services through any of a variety of different techniques or combinations of techniques. In one example, the system can be configured conduct a search of services online, e.g., via Web crawling or the like, to locate available services from service providers. The system can locate services through discovery of a service description for the service. In other cases, when a service listing, e.g., a centralized listing, is available, the system can query the listing of services and/or service providers to search for complementary services.

In another example, the system can be configured to analyze user data that can be maintained within a directory or other data store. The data can specify or include associations between the users of an organization, e.g., a company or the like, and one or more other cloud service providers. For example, users within an organization can maintain a listing of various services or cloud service associations within a directory listing that each respective user utilizes or finds useful. The system can search the directory for complementary services.

Continuing with the prior example, the system can evaluate usage statistics and/or patterns of the services by users when such information is available to the system. The system can select particular complementary services from a plurality of available complementary services. For example, when more than one encryption service is identified from the user data, the system can select the encryption service that is utilized by more users, select the encryption system that is accessed more frequently, etc.

In another example, the system can access different forms of social media and analyze the content contained therein to discover complementary services. For instance, the system can access and analyze discussion threads, forums, blogs, or other forms of social media to identify mention of or instances in which a service and/or service provider is noted within the particular channel or channels of social media being analyzed. The system can process text obtained from the different forms of social media to identify services noted therein from the context.

In still another example, the system can subscribe to one or more feeds available online and analyze the data received within the feed to identify mention of complementary services. For example, the system can register as a user to receive a feed from one or more service providers. The content of the feed can be analyzed for instances in which a particular service (e.g., a service type) is mentioned or noted.

The particular way in which complementary services are identified is not intended to limit the embodiments disclosed within this specification. The system can apply the different techniques described, including other known techniques, individually, in varying combinations, or all collectively to discover services that match a list of one or more services determined to be complementary with an offered service. Further, in discovering complementary services, any of a variety of available communication mechanisms and/or protocols can be utilized. For example, Simple Network Management Protocol (SNMP), Representational State Transfer (REST), JAVA, Remote Method Invocation (RMI), self reflection and/or description technologies, Real Time Communication (RTC), proprietary protocols, etc., can be used to expose the service or parts thereof, e.g., the service description and/or the API.

In step 510, the system can select a subset of one or more complementary services from the services discovered in step 505 as candidate services. Each selected service is a candidate for combining with the offered service. Candidate services can be selected in a variety of ways.

In one aspect, the system can evaluate the service description of each discovered service to determine whether the service may technically be integrated, or is compatible, with the offered service. For example, the system can evaluate the service description to determine whether the service description specifies one or more attributes that are desirable and/or needed (e.g., required) in a complementary service. The system can maintain a listing of desired complementary services and requirements for integration of such complementary services with the offered service. The system can compare the requirements with data specified within the service description of each complementary service considered for candidacy.

In another aspect also relating to whether the service is compatible with the offered service, the system can be configured to evaluate the API of each service considered for candidacy. For example, the system can evaluate the API of each system being considered to determine whether the system, from a technical perspective, can be integrated with the offered service. The system can maintain a listing of requirements in terms of what the API of a complementary service should include in terms of inputs and/or outputs in order to be compatible with the offered service. The system can compare these requirements for integration with the published API of each service under consideration for candidacy.

The system also can be configured to determine whether integrating the services under evaluation for candidacy makes business sense. Presuming, for example, that a given service can be technically integrated with the offered service, the system also can determine whether integration of the service with the offered service makes business sense.

The system can be configured to evaluate one or more other attributes of the service description that relate to business concerns such as the SLA, pricing, and the like. For example, the system can apply an algorithm to the determined data to generate a score for each service under consideration. The higher the score for a given service, the more likely that integrating the service with the offered service will result in increased value.

In determining the score, the system can weight different attributes according to importance. For example, the system can apply a weighting factor that increases the importance of a penalty based SLA when considering whether to accept a service as a candidate for integration. Those services with penalty based SLAs, with all other things being equal, will have a higher score than those that do not. In another example, the system can add a weighting factor that is dependent upon the novelty of the service being considered. In illustration, the scoring algorithm can be configured so that a service that is offered by fewer providers is scored higher than a same or similar service that is offered by many (e.g., more) providers. For example, when a particular service is considered novel in that no other equivalent services have been discovered, the score of the service can be increased by a predetermined quantity or factor.

In step 515, the system can select one or more of the services under evaluation as candidates. The system can select one or more, e.g., each, service that the system determines can be technically integrated with the offered service. In one aspect, of the services that can be integrated, the system can select those services with at least a minimum score from the business evaluation. It should be appreciated that when two or more similar services, e.g., two or more encryption services, are being considered for candidacy, the score that is generated can be used to rank the various services. The system can select the complementary service with the highest score as a candidate or the highest among two or more scores that is above the minimum allowed score.

In step 520, the system can generate a new service. The system can generate a new service by integrating the candidate service(s) with the offered service. The system can generate a new service, e.g., a new integrated service, in which the offered service functions cooperatively with the candidate service to provide a new "integrated" service. Taking the prior example, whereas the offered service was simply electronic mail, the system can generate one or more new services through integration of one or more candidate services. For example, the system can generate a new integrated service in which electronic mail is provided with data archiving. The system also can offer another new service in which electronic mail is offered with encrypted data archiving.

In integrating the candidate service(s) with the offered service, the system can generate program code, for example, as may be required to invoke the candidate service(s) in a cooperative manner with the offered service. Continuing with the prior example, the system can generate the necessary program code automatically to invoke the encryption service and provide electronic mail to be encrypted to the encryption service. The system further can generate program code automatically to receive the encrypted electronic mail as output and send/or direct the encrypted mail to the data archival service for archiving. Similar program code can be generated that allows the process to be reversed, e.g., encrypted and archived electronic mail to be retrieved (unarchived), decrypted, etc.

In step 525, the system can generate an entry for the integrated service(s), e.g., the newly created service(s), in a service catalog that is made available or otherwise published and specifies available services from the provider of the offered service. Accordingly, the integrated service that is a combination of the offered service with the complementary service(s) can be discovered by users and accessed without requiring user intervention in creating and/or publishing the new service.

The inventive arrangements disclosed within this specification allow a service provider, e.g., a cloud service provider, to automatically identify one more services that are complementary with one or more services already offered by the provider. The identified services can be evaluated and automatically integrated with the offered service(s) to enhance the portfolio of services available from the service provider.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a processor configured to initiate executable operations comprising:
discovering a plurality of services that are complementary to an offered service;
selecting a service from the plurality of services as a candidate for integration with the offered service;
automatically generating a new service by integrating the candidate service with the offered service; wherein the automatically generating the new service generates program code that invokes the candidate service in a cooperative manner with the offered service; and
including the new service in a service catalog.

2. The system of claim 1, further comprising:
searching social media for services that are complementary to the offered service.

3. The system of claim 1, further comprising:
searching data specifying associations between users and cloud service providers for services that are complementary to the offered service.

4. The system of claim 1, further comprising:
determining whether each of the plurality of services is compatible with the offered service.

5. The system of claim 4, further comprising:
comparing an attribute from a service description of each service with a service requirement for integration with the offered service.

6. The system of claim 4, further comprising:
comparing an attribute from an application programming interface of each service with a service requirement for integration with the offered service.

7. The system of claim 4, further comprising:
scoring each compatible service according to an attribute of a service level agreement for the service.

8. A computer program product, comprising:
a computer readable storage device having stored thereon program code that, when executed, configures a processor to perform executable operations comprising:
discovering a plurality of services that are complementary to an offered service;
selecting a service from the plurality of services as a candidate for integration with the offered service;
automatically generating a new service, using the processor, by integrating the candidate service with the offered service; wherein the automatically generating the new service generates program code that invokes the candidate service in a cooperative manner with the offered service; and
including the new service in a service catalog.

9. The computer program product of claim 8, wherein the computer readable storage medium further stores program that, when executed, configures a processor to perform an executable operation comprising:
searching social media for services that are complementary to the offered service.

10. The computer program product of claim 8, wherein the computer readable storage medium further stores program that, when executed, configures a processor to perform an executable operation comprising:
searching data specifying associations between users and cloud service providers for services that are complementary to the offered service.

11. The computer program product of claim 8, wherein the computer readable storage medium further stores program that, when executed, configures a processor to perform an executable operation comprising:
determining whether each of the plurality of services is compatible with the offered service.

12. The computer program product of claim 11, wherein the computer readable storage medium further stores program that, when executed, configures a processor to perform an executable operation comprising:
comparing an attribute from a service description of each service with a service requirement for integration with the offered service.

13. The computer program product of claim 11, wherein the computer readable storage medium further stores program that, when executed, configures a processor to perform an executable operation comprising:
comparing an attribute from an application programming interface of each service with a service requirement for integration with the offered service.

14. The computer program product of claim 11, wherein the computer readable storage medium further stores program that, when executed, configures a processor to perform an executable operation comprising:
scoring each compatible service according to an attribute of a service level agreement for the service.

15. A system comprising:
a processor configured to initiate executable operations comprising:
determining a plurality of services that are complementary to an offered service;
determining whether each of the plurality of services is compatible with the offered service;
selecting a compatible service as a candidate for integration with the offered service;
and automatically generating a new service by integrating the candidate service with the offered service; wherein the automatically generating the new service generates program code that invokes the candidate service in a cooperative manner with the offered service.

16. The system of claim 15, wherein selecting further comprises:
scoring each compatible service according to an attribute of a service level agreement for the service; and
choosing the service with at least a minimum score as the candidate.

17. The system of claim 15, wherein determining whether each of the plurality of services is compatible comprises:
comparing an application programming interface of each service with a list of requirements for integration with the offered service.

* * * * *